United States Patent [19]

Ballew et al.

[11] Patent Number: 4,577,272

[45] Date of Patent: Mar. 18, 1986

[54] FAULT TOLERANT AND LOAD SHARING PROCESSING SYSTEM

[75] Inventors: James D. Ballew, Garland; Phil H. Rogers, Dallas, both of Tex.

[73] Assignee: E-Systems, Inc., Dallas, Tex.

[21] Appl. No.: 508,101

[22] Filed: Jun. 27, 1983

[51] Int. Cl.⁴ .................. G06F 15/16; G06F 11/00
[52] U.S. Cl. .................................................. 364/200
[58] Field of Search ... 364/200 MS File, 900 MS File; 371/36, 68, 7, 9, 11

[56] References Cited

U.S. PATENT DOCUMENTS

| | | |
|---|---|---|
| 3,787,816 | 1/1974 | Hauck et al. ............ 364/200 |
| 4,032,899 | 6/1977 | Jenny et al. ............ 364/200 |
| 4,356,550 | 10/1982 | Katzman et al. .......... 364/200 |
| 4,394,727 | 7/1983 | Hoffman et al. .......... 364/200 |
| 4,403,286 | 9/1983 | Fry et al. .............. 364/200 |
| 4,412,281 | 10/1983 | Works .................. 364/200 |

*Primary Examiner*—James D. Thomas
*Assistant Examiner*—William G. Niessen
*Attorney, Agent, or Firm*—Albert M. Crowder, Jr.

[57] ABSTRACT

Incoming data messages to a system having a plurality of channels are assigned for processing to one of the channels to share the processing load more or less equally among all the channels of the system. Each channel receives messages by means of a communications link for processing. Included in each channel is a disk drive for a storage medium, a disk controller and peripheral controllers for input/output equipment as required. Each channel of the system also includes a data processor. A message is received from the communication link of any of the channels, which message is identified by the data processor of that channel. The processor then evaluates the number of messages waiting to be processed in each of the other channels for assignment to a channel having the least number of messages on the processing list. The processor considers only on-line channels in this assignment selection. Upon the failure of a channel that has messages assigned thereto, these messages will be reassigned to other on-line channels by a back-up channel that has been previously identified with the failed channel. Thus, messages are processed as expeditiously as possible by load sharing.

19 Claims, 8 Drawing Figures

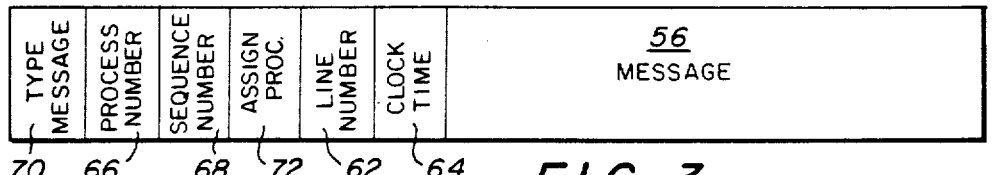
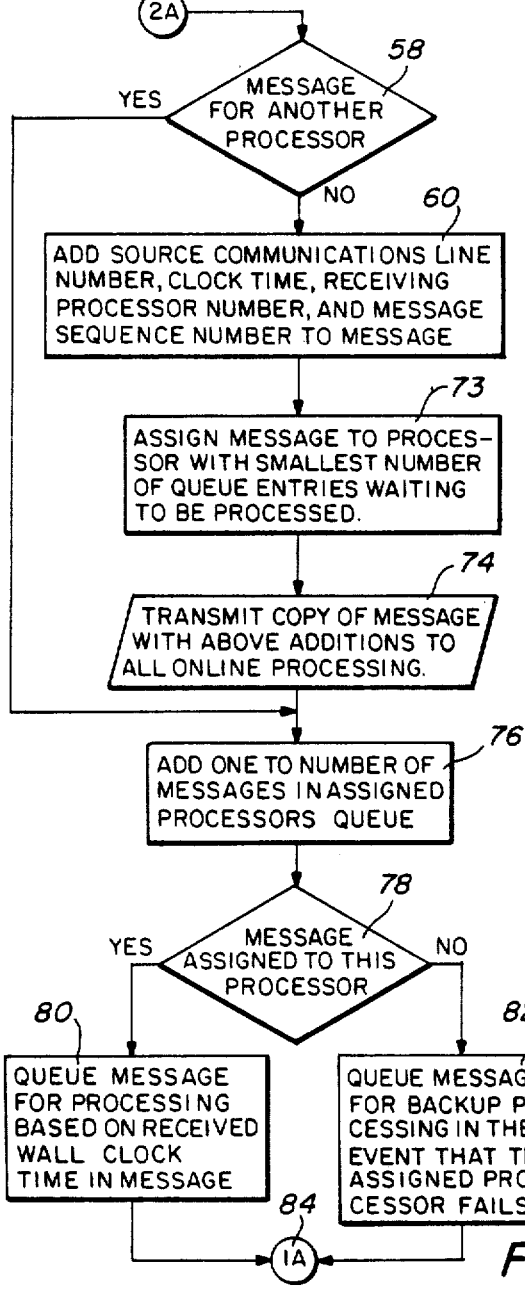
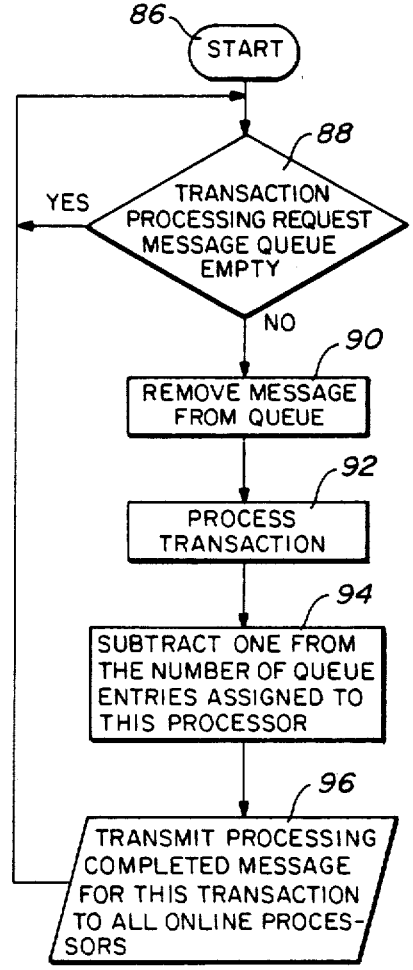

FAULT TOLERANT AND LOAD SHARING PROCESSING SYSTEM

TECHNICAL FIELD

This invention relates to a data processing system having a reliability factor greater than the reliability of individual components, and more particularly, to a fault tolerant data processing system having load sharing capabilities.

BACKGROUND ART

Computer systems have evolved from the individual stand-alone units whose reliability was no better than that of the least reliable component of the entire system. There developed from these early computers operating systems that joined several computers together into a network where reliability was increased by the sheer multiplication of numbers, that is, by providing back-up computing capability to take over in case of a failure of a primary system. In control theory this is known as redundancy which, while effective to improve system reliability, is ineffective from a cost standpoint. Today there are sophisticated computer systems that incorporate the advantageous cost effective features of earlier computers but minimize the shortcomings of such computers. One such modern computer system is available from Tandem Computers Incorporated of Cupertino, Calif. This computer system of Tandem Computers Incorporated is described in a manual, Part No. 82000, dated October, 1980. The computer system of Tandem Computers Incorporated provides fault tolerance, on-line repair, and a modular design, all to enhance system reliability. The computer system of Tandem Computers Incorporated utilizes interprocessor communication over multiple processor buses thereby eliminating the need for shared memory between the various processor channels.

Fault tolerance is the availability of a system to continue operation even if a particular component or even an entire system channel fails.

DISCLOSURE OF THE INVENTION

To provide a fault tolerant computer system with load sharing capabilities two or more channels (subsystems) with similar central processors and operating system software are interconnected by way of a back-end communications network. The back-end communications network consists of two or more interprocessor data channels which support processor-to-processor data transfers. Each channel includes a processor that has one or more input/output devices which interface with system input/output controllers. In addition, each channel includes a disk or tape storage or other storage media, along with communication lines. Each of the channels has the capability of processing all input data received by the system.

Load sharing in a system of the present invention is based on processor-to-processor communications thereby permitting the processing of input data by any channel with the selection of the processing channel based on that channel having the least processing activity. Fault tolerance is achieved by including within the system secondary access paths to equipment controllers and having all input data signals and processing requests recorded by both the channel that accepted the input and a second designated back-up channel with minimal shared equipment. In the event of equipment failure this feature permits the processing to be restarted by the back-up channel and any expected response to an input will be generated with no loss of overall system function.

In accordance with the present invention there is provided a method of allocating incoming message data for processing in one channel of a multi-channel fault tolerant load sharing data processing system by first identifying an incoming message for assignment to one of the channels of the system for processing. The identified message is assigned to a channel having the smallest number of messages waiting to be processed. After assignment of the identified message to a channel it is then transmitted to the assigned channel for processing in the order assigned. The assigned message is also transmitted to at least one other channel of the system for back-up storage.

Also in accordance with the present invention there is provided apparatus for a multi-channel fault tolerant load sharing data handling system which includes a communications controller in each channel connected to one or more communications links for receiving messages from a remote terminal for processing. Each channel of the system also includes data storage means including a controller therefore to store operational instructions and message data. Further, each channel is equipped with a processor interconnected to the communications controller and the data storage means and to the processor of each of the other channels in the system. Within each processor is a means for assigning incoming message data to any of the channels in the system for processing thereof.

BRIEF DESCRIPTION OF THE DRAWINGS

For a more complete understanding of the present invention and the advantages thereof, reference is now made to the following description taken in conjunction with the accompanying drawings.

Referring to the drawings:

FIG. 3 illustrates a message with data blocks added thereto by the process of FIG. 2 for load sharing;

FIG. 4 is a flow chart of a process run by any of the processors of FIG. 1 for assignment of an incoming message to one of the system channels for processing;

FIG. 5 is a flow chart of a process run by any of the processors of FIG. 1 for processing a message assigned to a particular channel;

DETAILED DESCRIPTION OF THE INVENTION

Figure 1:
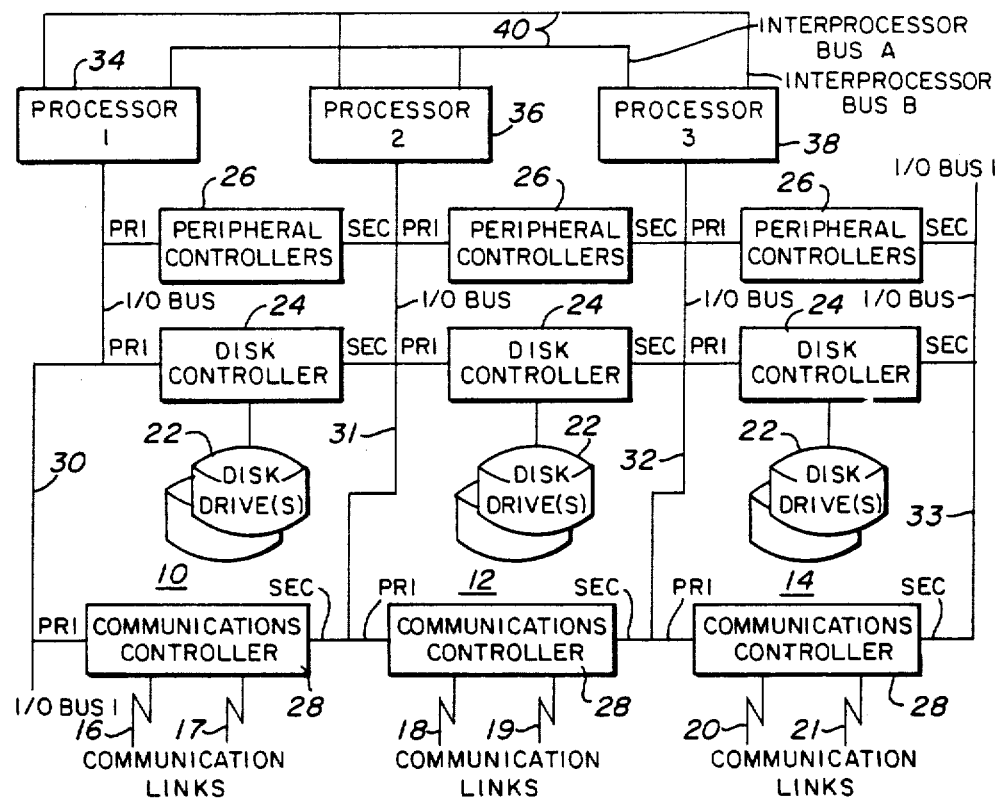
FIG. 1 is a block diagram of a multi-channel fault tolerant load sharing transaction processing system.

Referring to FIG. 1, incoming messages containing data to be processed enter the system by one of the communication links 16–21 identified with one of the system channels 10, 12 or 14. While a system containing only three channels is illustrated and described, it may be expanded to include additional channels for data processing in accordance with the programs to be described.

Each of the system channels 10, 12 and 14 is similar and includes a disk drive or drives 22 operational in response to commands from a disk controller 24. Also forming a part of each of the system channels is a peripheral controller 26 for accessory components that varies with the utilization of the system.

Messages input through the data communications links 16-21 are coupled into the system through communications controllers 28. The communications controllers, disk controllers 24 and peripheral controllers 26 are interconnected by input/output data buses 30-33.

Connected to the data bus 30 is a processor 34 for the system channel 10. This processor runs the programs as stored in the disk drive for the channel 10 for transaction processing and message assignment. Similarly, a processor 36 connects to the data bus 31 for processing programs of the system channel 12 and a processor 38 is connected to the input/output data bus 32 and runs the programs of the system channel 14. Each of the processors 34, 36 and 38 are interconnected by back-end interprocessor communication buses 40 and 42.

Typical computer systems employing the components as illustrated in FIG. 1 are the Tandem Non-Stop II Computer System built by Tandem Computer Corporation of Cupertino, Calif. and a computer system built by Stratus Computer Corporation, 17-19 Stethmore Road, Natik, Mass. Each of the components of the system shown in FIG. 1 is available from either of the sources mentioned above. In one implementation of the system of the present invention, components of the Tandem Non-Stop II Computer System was utilized.

An incoming message on one of the communication links 16-21 is assigned to one of the system channels 10, 12 or 14 for processing on the basis that the message will be assigned to that channel having the fewest messages assigned thereto and waiting processing. To perform the channel assignment each processor 34, 36 and 38 maintains a list containing information identifying which of the channels are on-line and a count of the number of messages assigned to each of the channels and holding for processing.

Figure 2:
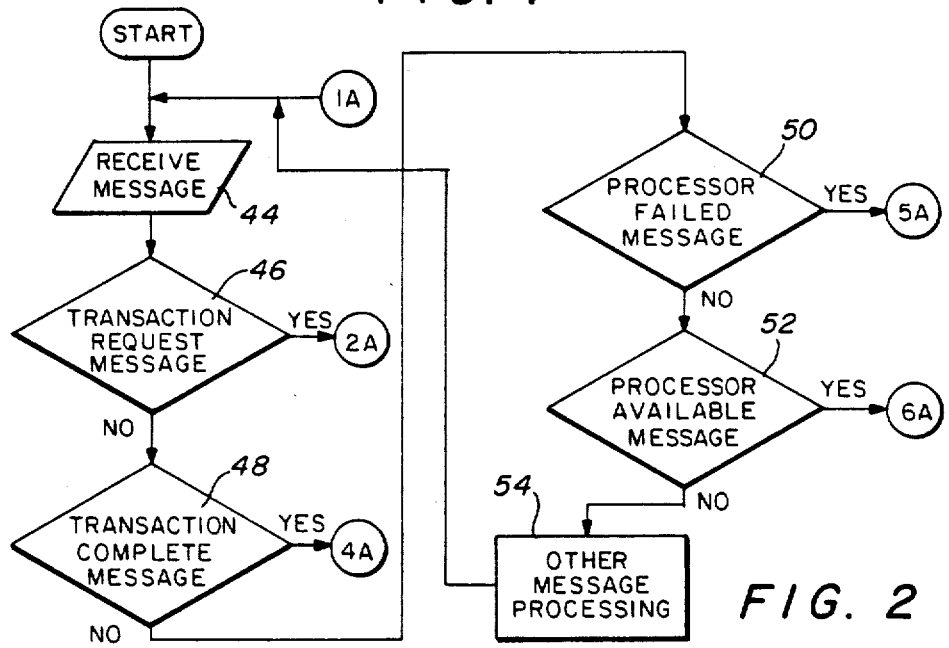
FIG. 2 is a flow diagram of a process run by any of the processes of FIG. 1 upon receipt of an incoming message.
Figures 6, 7, 8:
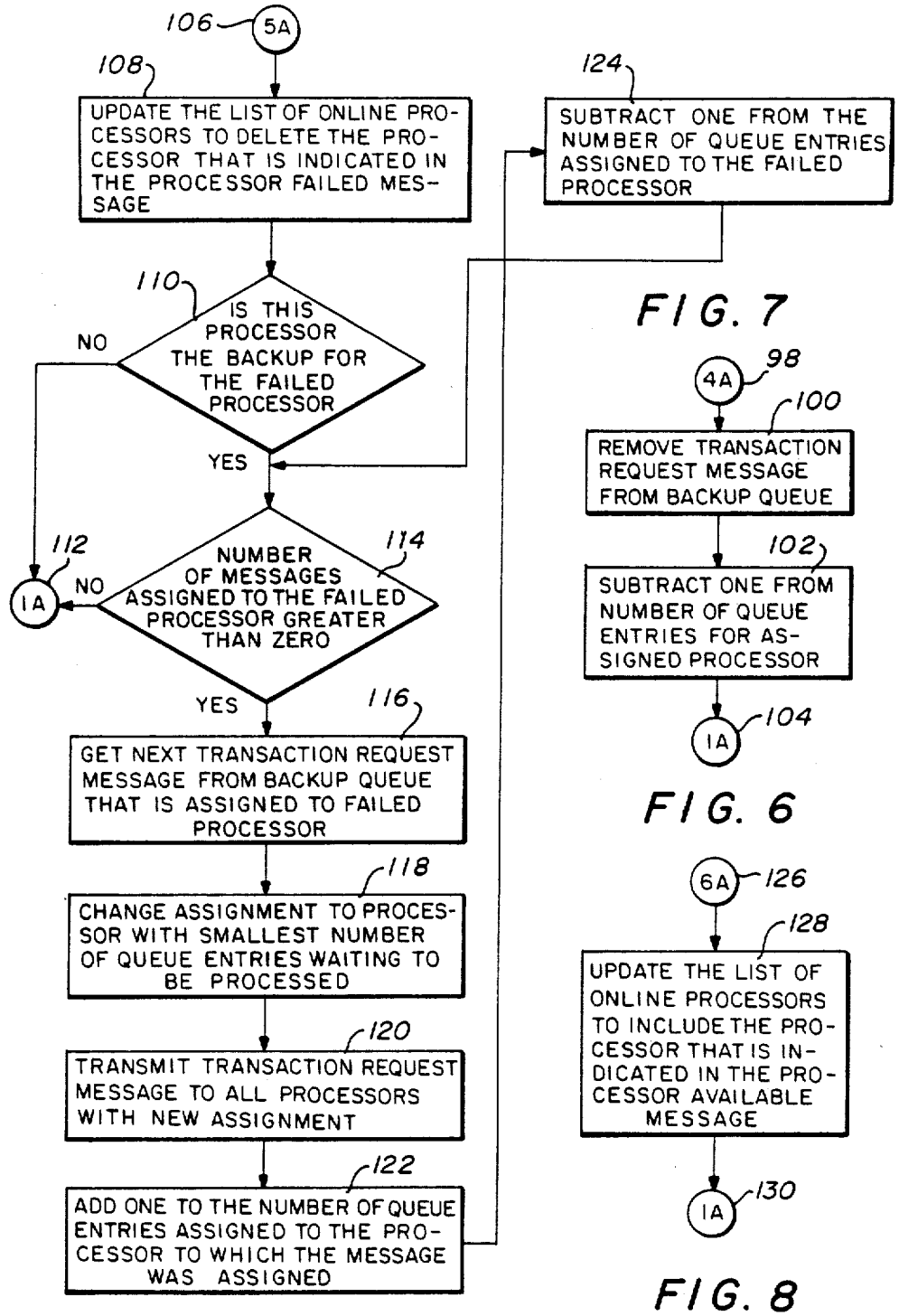
FIG. 6 is a flow chart of a process for a completed message transaction run on any of the channels of the system of FIG. 1.
FIG. 7 is a flow chart run by a processor of any of the channels of FIG. 1 to evaluate the failure of any other channel in the system.
FIG. 8 is a flow chart entered from the process of FIG. 2 to update the availability of a channel for processing an incoming message.

Referring to FIG. 2, initially, upon receipt of a message at the communications controller 28, a processor acknowledges receipt of the message during the running of a sequence 44. Next a sequence of checks 46 is made to determine if the message under consideration is one that has been called for processing, in which case the program of FIG. 2 steps to the subroutine of FIG. 4. However, if the message is not one for processing then the program of FIG. 2 advances to a sequence of checks 48 to determine if the processing of a previously stored message has been completed. If affirmative, the processor steps to the routine of FIG. 6 to run the transaction complete message program. If any message under evaluation by a channel processor is not one indicating that input data has been processed to completion, then a sequence of checks 50 will be made to determine if any one of the system channels has generated a processor failed message. Upon the failure of one of the system channels, the subroutine of FIG. 7 is run to reassign messages that were previously assigned to the failed channel to other still functioning channels. When the message under consideration by a processor is not one indicating a failed channel, then a sequence of checks 52 is made to determine if any of the channels have generated a processor available message. The processor available message indicates that either a previously failed channel has been brought back on line or that one channel has completed processing all messages waiting to be processed. A processor available message calls the subroutine of FIG. 8 while a negative result of the sequence 52 advances the subroutine of FIG. 2 to a sequence of evaluations 54, generally identified as "other message processing". This is a miscellaneous sequence which, when completed, returns the routine of FIG. 2 back to the entry step.

Referring to FIGS. 3 and 4, an incoming message 56 is received and contains only data to be processed. During the operation of the subroutine of FIG. 2, a received message 56 causes the processor of the receiving channel to enter the subroutine of FIG. 4 at a sequence 58. Assuming that the message is not from another processor, the routine of FIG. 4 advances to a sequence of instructions 60 to add to the message block a communications line 62 identifying the input processor. Also added to the message block at this time is the clock time 64 which is the time message is received by the channel. At this time there is also added to the message block 56 the processor number 66 identified by the reference number and a message sequence number identified by the reference number 68. An identification code 70 related to the type of message is also added to the message block 56.

Following these additions to the message block 56 the routine of FIG. 4 advances to an assignment sequence 73 which adds to the message block identification bits 72 so as to identify the channel to which the message has been assigned. To perform the channel assignment, each processor maintains a list of which channels are on line and a count of the number of messages assigned to each processor.

After a transaction request message has been assigned to a channel at the sequence 73 a copy of the message is sent to all the channels and stored on the disk 22 of each channel. This back-up storage prevents data loss in the event that hardware in any of the channels should fail. Transmission of a message copy with all the block assignments as shown in FIG. 3 is completed by a sequence of instructions 74 of FIG. 4.

After a message has been received by a channel and stored for back-up to prevent data loss, the routine of FIG. 4 advances to add one to the number of messages assigned to a processor in a sequence 76. This assignment of a message to a particular channel for processing is also transmitted to each processor of the other channels in order to run the routine of FIG. 4 upon receipt of each message. Thus, each processor includes a list (queue) showing the number of messages to be processed by each channel of the system. This message transmitted to each channel also identifies the channel that assigned that message. The processor of the channel that has been assigned the message for processing also places the message on its list (queue) of work to be processed. The request message is added to the queue based on the clock time that it entered the system.

Following the updating of the queue of each of the processors with the channel assignment number, the routine of FIG. 4 advances to a sequence of inquiries 78 to determine if the message was assigned to the channel of the processor running the routine of FIG. 4. If the processor running the subroutine of FIG. 4 is part of the channel that was assigned the message for processing, then the message is placed on the queue for processing during a sequence 80 based on the received clock time of the data block 64. If the processor running the subroutine of FIG. 4 is not part of the channel that was assigned the message for processing, then the message is placed in the queue for back-up processing in the event that the assigned processor fails. This operation is completed at a sequence of instructions 82.

Following completion of either of the sequence 80 or the sequence 82 the subroutine of FIG. 4 steps to an end 84 and returns the processor operation to the routine of FIG. 2.

Referring to FIG. 5, there is shown the processing routine for each of the channels of the system of FIG. 1 to be carried out for each message in the queue awaiting to be processed. As a message becomes available for processing, the transaction processing routine of FIG. 5 enters at a start instruction 86 and runs a sequence of inquiry steps 88 to determine if there are any additional messages in the queue to be processed. When the message queue is empty, the inquiry instructions 88 recycles until a message becomes available for processing.

The next available message for processing in the message queue is removed therefrom during a running of a sequence 90 and a particular transaction process is run during sequence 92. The particular process transaction that is carried out at 92 varies with the message and the process required and forms no part of the present invention. A processing routine will be selected on the basis of the use of the system of the present invention.

Following completion of the process transaction the number of messages awaiting to be processed is reduced by one in a sequence of instructions 94. Note, that this operation generates a message to subtract one message from each of the processor of each channel in the system. That is, after completion of the routine of FIG. 5, all back-up storage and reference to the processed message will be deleted from each channel. Following the generation of the subtraction message at sequence 94 a processing complete message is transmitted to all the on-line processors of the system during instruction sequence 96. This step is the actual notification of each of the processors of all on-line channels that a message has been processed and is to be removed from the queue of the individual channels.

Upon receiving and processing a transaction complete message, the channel returns to the program of FIG. 2 completing the routine of FIG. 5 and steps the routine of FIG. 2 to the inquiry instructions 48 which calls the subroutine of FIG. 6.

With reference to FIG. 6, this is a transaction complete message processing routine which is entered from the inquiry instructions 48 at an entrance instruction 98. The transaction request message is removed from the back-up queue of the channel during the running of a sequence of instructions 100. Next, the number of messages waiting to be processed in the channel sending the transaction complete message is reduced by one by a sequence of instructions 102. As mentioned, the subroutine of FIG. 6 is run by each channel upon receiving a transaction complete message from the channel processing a message. With the completion of the instruction sequence 102, the subroutine of FIG. 6 steps to an end at 104 and returns the processor to the routine of FIG. 2.

During the running of the routine of FIG. 2, if a processor failed message has been received by a channel then during the running of the inquiry instructions 50, the processor failed subroutine of FIG. 7 is called. A processor failure is detected by the operating system software running in a different process. This decision is made based on the absence of a response to periodic requests made by each operating system to every other operating system. These requests are referred to as "are you alive messages" and the responses acknowledge that the processor is o.k. as far as the operating system can determine. This subroutine is entered at 106. Again, it should be recalled that the processor of each channel is running the routine of FIG. 2 and each will receive the processor failed message and in turn run the subroutine of FIG. 7.

Referring to FIG. 7, after entering the subroutine at 106, a sequence of instructions 108 is run to update the list of channels that are operating on-line. During this sequence the channel identified in the processor failed message will be deleted from the list of active or on-line channels. Following the update of the on-line list, inquiry instructions 110 are run to determine if the processor running the subroutine of FIG. 7 is the back-up channel for the failed channel. If not, then the subroutine of FIG. 7 steps to an end at 112 to return the processor operation to the routine of FIG. 2.

When the processor running the subroutine of FIG. 7 is the back-up processor then a sequence of inquiry instructions 114 is run to determine if there are any messages that were assigned to the failed processor. If no messages were assigned to the failed channel, then again the subroutine of FIG. 7 steps to an end at 112 and returns the operation to the routine of FIG. 2. If additional messages are in the queue of the failed channel then the next transaction request message is called from the back-up queue during a sequence of instructions 116. Note, the transaction request message that is called from the queue is one that had previously been assigned to the failed channel. The assignment of the called-up message is now changed during a sequence of instructions 118. This assignment is on the same basis as an original assignment, that is, the assignment is to the channel with the smallest number of messages in the queue waiting to be processed.

Following the identification and assignment of a new channel for a message from a failed channel, a transaction request message is transmitted to each processor of all the channels identifying the new channel assignment. This transmission is completed during a sequence 120. Following the transmission of the transaction request message, the number of entries in a queue to which the message has been reassigned is increased by one. This incrementing of the queue is carried out during instructions 122. Next the number of messages waiting to be processed in the queue of the failed channel is reduced by one. This subtraction process is completed during a sequence 124.

The subroutine of FIG. 6 then recycles to the inquiry instructions 114. The routine continues through the sequences 116, 118, 120, 122 and 124 until the inquiry sequence 114 indicates that no further messages are assigned to the failed channel. This is the situation discussed previously which steps the subroutine of FIG. 7 to a completion step at 112 to return the operation of the processor to the routine of FIG. 2.

Whenever a channel that was previously off-line for any reason becomes available again for processing, then a processor available message is sent by this channel to each of the other channels. The processor of each channel during the running of the routine of FIG. 2 will identify this processor available message at the inquiry sequence 52. The routine of FIG. 2 then calls in the subroutine of FIG. 8.

Referring to FIG. 8, this subroutine is entered at 126 and advances to an update sequence 128. The sequence 128 updates in the processor the number of channels available for processing. As previously discussed, this enables the processor in each channel to consider those channels available when new messages are received on the data links 16-21. It will be evident that when a channel comes on line, the number of messages waiting to be processed in the queue will be zero. Thus, this channel will be assigned incoming messages on a priority basis until the messages waiting processing in all on-line channels is more or less equal. Note, however, that if a message is received in a channel that does not have a message waiting for processing, then the new message will be automatically assigned to the receiving channel even though another channel has recently come on line. Thus, message assignment will be first made to the channel receiving the message if the number of messages waiting processing is equal to all other channels in the system.

Upon completion of the update at 128 the subroutine of FIG. 8 steps to an end at 130 to return the processor operation to the routine of FIG. 2.

Operationally, the processor of each channel continues to run the routine of FIG. 2 calling in the subroutines of FIGS. 4-8 as required to process messages incoming to the system. Incoming messages are continuously assigned to a channel for processing and the message is transmitted to each channel for protection in the event that an assigned channel goes off-line. It will be understood that if all the channels of the system are operating on-line, then the subroutines of FIGS. 7 and 8 will not be called. The subroutine of FIG. 7 is called only upon the failure of a channel and the subroutine of FIG. 8 is called only when a channel comes on-line in the system.

Although the invention has been described in detail, it is to be clearly understood that the same is by way of illustration and example only and is not to be taken by way of limitation, the spirit and scope of the invention being limited only to the terms of the appended claims.

We claim:

1. A method of allocating incoming messages for processing in one channel of a multi-channel fault tolerant, load sharing data processing system and for reassigning message upon the malfunctioning of a channel, comprising the steps of:

identifying each incoming message at each channel of the data processing system containing data to be processed for assignment to one of the channels of the systems for processing;

assigning the identified message to the channel having the smallest number of messages waiting to be processed;

transmitting the identified message to the assigned channel for processing in the order assigned;

transmitting the assigned message to at least one other channel of the system for back-up storage;

monitoring each of the channels of the system for a malfunction condition;

identifying each message in all functioning channels that remains unprocessed and assigned to the malfunctioning channel;

reassigning each of the identified messages to the remaining functioning channels on the basis of the smallest number of messages waiting to be processed; and in response to a reassignment of a message, processing the message in the reassigned channel.

2. A method of allocating incoming messages as set forth in claim 1 wherein the step of identifying a message includes adding a source communication line number to the message to permit a processed response to be routed to the correct channel.

3. A method of allocating incoming messages as set forth in claim 1 wherein the step of identifying a message includes adding the received channel number to the message prior to assignment to a channel for processing.

4. A method of allocating incoming messages as set forth in claim 1 wherein the step of identifying a message includes adding a sequence number to the received message.

5. A method of allocating incoming messages as set forth in claim 1 including the step of incrementing by one the number of messages waiting to be processed in the channel assigned the last transmitted message.

6. A method of allocating incoming messages as set forth in claim 1 including repeating the step of reassigning each of the messages waiting to be processed in the malfunctioning channel until all messages have been reassigned to other functioning channels of the systems.

7. A method of allocating including messages as set forth in claim 1 including the step of updating the list of functioning channels and deleting from the list channels that have malfunctioning and identifying channels available for message processing.

8. A method of allocating incoming messages for processing as set forth in claim 1 including the step of identifying in each back-up channel the completion of the processing of a message in the assigned channel.

9. A method of allocating incoming messages as set forth in claim 8 including the step of updating the queue of messages to be processed in each functioning channel upon completion of the processing of an assigned message.

10. A method of allocating incoming message for processing in one channel of a multi-channel fault tolerant, load sharing data processing system and for reassigning message upon the malfunctioning of a channel, comprising the steps of:

identifying each message at each channel of the data processing system containing data to be processed for assignment to one of the channels of the system for processing, said identification including adding the clock time of arrival to the message;

assigning a message to the channel having the smallest number of messages waiting to be processed;

transmitting the identified message to the assigned channel for processing in the order assigned;

processing the message identified in the channel having the earliest clock time assigned thereto;

monitoring the assigned channel for a malfunction condition;

in response to a malfunction condition in the assigned channel, reassigning each of the messages in the fault condition channel to other channels of the system for processing in accordance with the clock time of arrival of the message to the system; and in response to the reassignment of a message, processing the message in the reassigned channel.

11. A method of allocating incoming messages for processing as set forth in claim 10 including the step of transmitting the processed message from the system through the channel that originally received the message.

12. A method of allocating incoming messages as set forth in claim 10 including the step of listing in each channel of the system the number of messages to be processed by each of the other channels of the system.

13. A method of allocating incoming messages as set forth in claim 10 including the step of identifying each message in a channel with the channel originally receiving the message.

14. A method of allocating incoming messages as set forth in claim 10 including the step of placing each message assigned to a channel on a queue of work to be processed on the basis of the clock time the message entered the system.

15. A method of allocating incoming messages for processing as set forth in claim 10 including the step of transmitting each received message to all of the channels of the system for back-up storage.

16. A method of allocating incoming message for processing as set forth in claim 15 including the step of removing from storage after completion of the processing thereof in the assigned channel each back-up of the message stored in each of the other channels of the system.

17. A method of allocating incoming messages for processing in one channel of a multi-channel fault tolerant, loading sharing data processing system, comprising the steps of:
    transmitting an incoming message to more than one channel of the system;
    generating a channel fail message for any channel that has malfunctioned;
    identifying each message in all functioning channels that remains unprocessed and assigned to the failed channel; and
    reassigning each of the identified messages to the remaining functioning channels on the basis of the smallest number of messages waiting to be processed.

18. A method of allocating incoming messages for processing as set forth in claim 17 including the step of reassigning each of the messages waiting to be processed in the failed channel until all such messages have been reassigned to other functioning channels of the system.

19. A method of allocating incoming messages for processing as set forth in claim 17 including the step of transmitting a transaction request message to each of the channels identifying a reassignment of each message from the failed channel.

* * * * *